United States Patent
Niikura

(10) Patent No.: US 10,771,594 B2
(45) Date of Patent: *Sep. 8, 2020

(54) COMMUNICATION APPARATUS, CONTROL METHOD FOR THE COMMUNICATION APPARATUS, AND STORAGE MEDIUM

(71) Applicant: CANON KABUSHIKI KAISHA, Tokyo (JP)

(72) Inventor: Yasuhito Niikura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,696

(22) Filed: Sep. 11, 2017

(65) Prior Publication Data

US 2017/0374181 A1 Dec. 28, 2017

Related U.S. Application Data

(63) Continuation of application No. 12/881,610, filed on Sep. 14, 2010, now Pat. No. 9,787,804.

(30) Foreign Application Priority Data

Sep. 17, 2009 (JP) ................................ 2009-216169

(51) Int. Cl.
*H04L 29/06* (2006.01)
*H04N 1/00* (2006.01)

(52) U.S. Cl.
CPC ............ *H04L 69/16* (2013.01); *H04L 69/165* (2013.01); *H04N 1/00209* (2013.01); *H04N 2201/33378* (2013.01)

(58) Field of Classification Search
CPC . H04N 2201/33378; H04N 2201/0094; H04N 1/00209; H04N 1/0022; H04N 1/00222
See application file for complete search history.

(56) References Cited

U.S. PATENT DOCUMENTS

| | | | | |
|---|---|---|---|---|
| 2010/0110465 A1* | 5/2010 | Ferlitsch | ............... | G06F 3/1206 358/1.13 |
| 2010/0169395 A1* | 7/2010 | Bryant-Rich | ......... | G06F 3/0605 707/831 |

* cited by examiner

*Primary Examiner* — Nam T Tran

(74) *Attorney, Agent, or Firm* — Canon U.S.A., Inc. IP Division

(57) ABSTRACT

A communication apparatus determines whether a file selected by a file selection unit is of a format analyzable by the communication apparatus. If it is determined that the file selected by the file selection unit is not of the format analyzable by the communication apparatus, the communication apparatus restricts selection of a predetermined protocol included in a plurality of protocols. The communication apparatus further determines whether the protocol selected by a protocol selection unit is a predetermined protocol. If it is determined that the protocol selected by the protocol selection unit is the predetermined protocol, the communication apparatus restricts selection of a file of a format not analyzable by the communication apparatus.

10 Claims, 10 Drawing Sheets

| TYPE OF TRANSMISSION | DOES DATA NEED TO BE HANDLED BY APPARATUS ? | PERMISSION OF TRANSMISSION FROM EXTERNAL MEDIUM |
|---|---|---|
| FAX | YES | INHIBITED/PERMITTED ONLY ABOUT DATA CONVERTIBLE BY APPARATUS |
| Internet-FAX | YES | INHIBITED/PERMITTED ONLY ABOUT DATA CONVERTIBLE BY APPARATUS |
| E-Mail | NO | INHIBITED/ALL PERMITTED/DETERMINED ACCORDING TO LIST/ PERMITTED ONLY ABOUT DATA CONVERTIBLE BY APPARATUS |
| FTP | NO | INHIBITED/ALL PERMITTED/DETERMINED ACCORDING TO LIST/ PERMITTED ONLY ABOUT DATA CONVERTIBLE BY APPARATUS |
| SMB | NO | INHIBITED/ALL PERMITTED/DETERMINED ACCORDING TO LIST/ PERMITTED ONLY ABOUT DATA CONVERTIBLE BY APPARATUS |
| MEMORY INCLUDED IN APPARATUS | YES | INHIBITED/PERMITTED ONLY ABOUT DATA CONVERTIBLE BY APPARATUS |

FIG. 4

| DESTINATION | TYPE OF TRANSMISSION | |
|---|---|---|
| 0123-456-789 | FAX | |
| abcd@domain.co.jp | Internet-FAX | ~401 |
| qwert@domain.co.jp | E-Mail | |
| abc/def/hij | FTP | |

| TYPE OF TRANSMISSION | DOES DATA NEED TO BE HANDLED BY APPARATUS ? | |
|---|---|---|
| FAX | YES | |
| Internet-FAX | YES | |
| E-Mail | NO | ~402 |
| FTP | NO | |
| SMB | NO | |
| MEMORY INCLUDED IN APPARATUS | YES | |

FIG. 7

| TYPE OF TRANSMISSION | DOES DATA NEED TO BE HANDLED BY APPARATUS? | PERMISSION OF TRANSMISSION FROM EXTERNAL MEDIUM |
|---|---|---|
| FAX | YES | INHIBITED/PERMITTED ONLY ABOUT DATA CONVERTIBLE BY APPARATUS |
| Internet-FAX | YES | INHIBITED/PERMITTED ONLY ABOUT DATA CONVERTIBLE BY APPARATUS |
| E-Mail | NO | INHIBITED/ALL PERMITTED/DETERMINED ACCORDING TO LIST/ PERMITTED ONLY ABOUT DATA CONVERTIBLE BY APPARATUS |
| FTP | NO | INHIBITED/ALL PERMITTED/DETERMINED ACCORDING TO LIST/ PERMITTED ONLY ABOUT DATA CONVERTIBLE BY APPARATUS |
| SMB | NO | INHIBITED/ALL PERMITTED/DETERMINED ACCORDING TO LIST/ PERMITTED ONLY ABOUT DATA CONVERTIBLE BY APPARATUS |
| MEMORY INCLUDED IN APPARATUS | YES | INHIBITED/PERMITTED ONLY ABOUT DATA CONVERTIBLE BY APPARATUS |

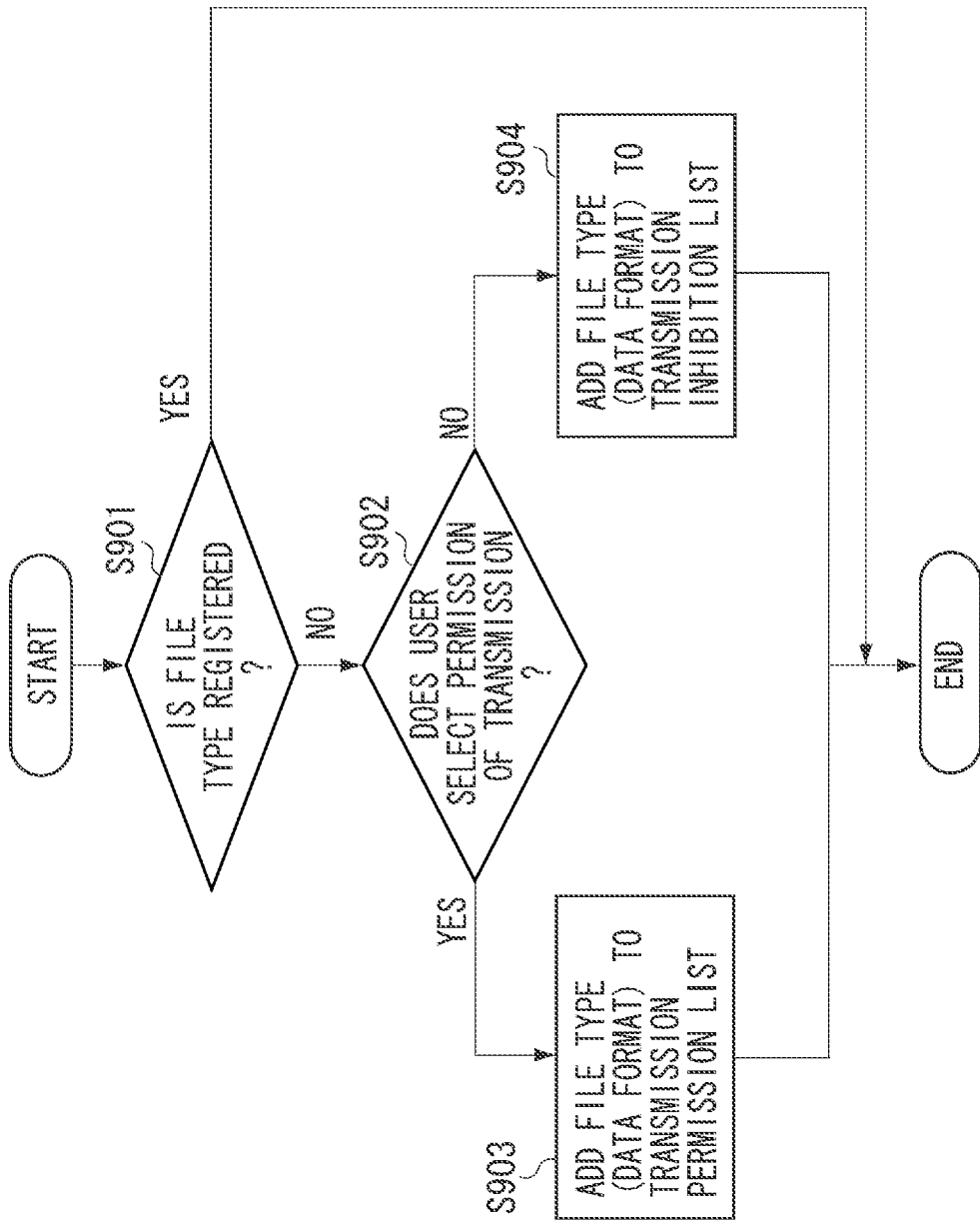

COMMUNICATION APPARATUS, CONTROL METHOD FOR THE COMMUNICATION APPARATUS, AND STORAGE MEDIUM

CROSS REFERENCE TO RELATED APPLICATIONS

This application is a continuation, and claims the benefit, of U.S. patent application Ser. No. 12/881,610, presently pending and filed on Sep. 14, 2010, and claims the benefit of, and priority to, Japanese Patent Application No. 2009-216169 filed Sep. 17, 2009 which applications are hereby incorporated by reference herein in their entireties.

FIELD OF THE INVENTION

The present invention relates to a communication apparatus capable of communicating in a plurality of protocols, a control method for the communication apparatus, and a storage medium.

DESCRIPTION OF THE RELATED ART

In recent years, progress has been made in external media as external storage devices, including their increased storage capacity and easier availability, for example. The external media are able to store data of various data formats, such as images, video, and music data (Japanese Patent Application Laid-Open No. 2008-028556). However, image processing apparatuses, such as multifunction peripherals (MFP), have come to include a function to analyze a file read from an external medium, for example, and to transmit it. With an image processing apparatus of this type, it is impossible to transmit a file of a data format which is not supported by the image forming apparatus. However, with an image forming apparatus which can transmit e-mail and a file according to a file transfer protocol (FTP), because it is not necessary to analyze the content of a file, the image forming apparatus can transmit a file of a data format not supported by the apparatus.

However, a conventional apparatus has the following issue. For example, when a transmission method is selected, such as G3 facsimile (FAX) transmission or Internet FAX transmission, a file needs to be rasterized into image data once in advance. Therefore, there is no other way but to transmit only files in a data format supported by the image processing apparatus as is conventionally done. Since there are restrictions according to a data format and a transmission method as described above, a user's operation becomes cumbersome and complicated.

SUMMARY OF THE INVENTION

The present invention is directed to a communication apparatus which can suitably apply restrictions according to a file format and a communication protocol when data is transmitted to an external apparatus and which can reduce the complexity of a user's operation.

According to an aspect of the present invention, a communication apparatus capable of communicating in a plurality of protocols includes a file selection unit configured to select a file to be transmitted, a protocol selection unit configured to select at least one transmission protocol from the plurality of protocols, a transmission unit configured to transmit the file selected by the file selection unit using the protocol selected by the protocol selection unit, a determination unit configured to determine whether the file selected by the file selection unit is of a format analyzable by the transmission apparatus, and a restriction unit configured to restrict selection of a predetermined protocol included in the plurality of protocols if the determination unit determines that the tile selected by the file selection unit is not of the format analyzable by the communication apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates examples of tables to define settings for destinations according to the first exemplary embodiment of the present invention.

FIG. 7 illustrates a table for registering permission/inhibition settings for respective transmission methods according to the second exemplary embodiment of the present invention.

FIG. 9 is a flowchart illustrating a data transmission procedure according to the second exemplary embodiment of the present invention.

DESCRIPTION OF THE EMBODIMENTS

Various exemplary embodiments, features, and aspects of the invention will be described in detail below with reference to the drawings.

Figure 1:
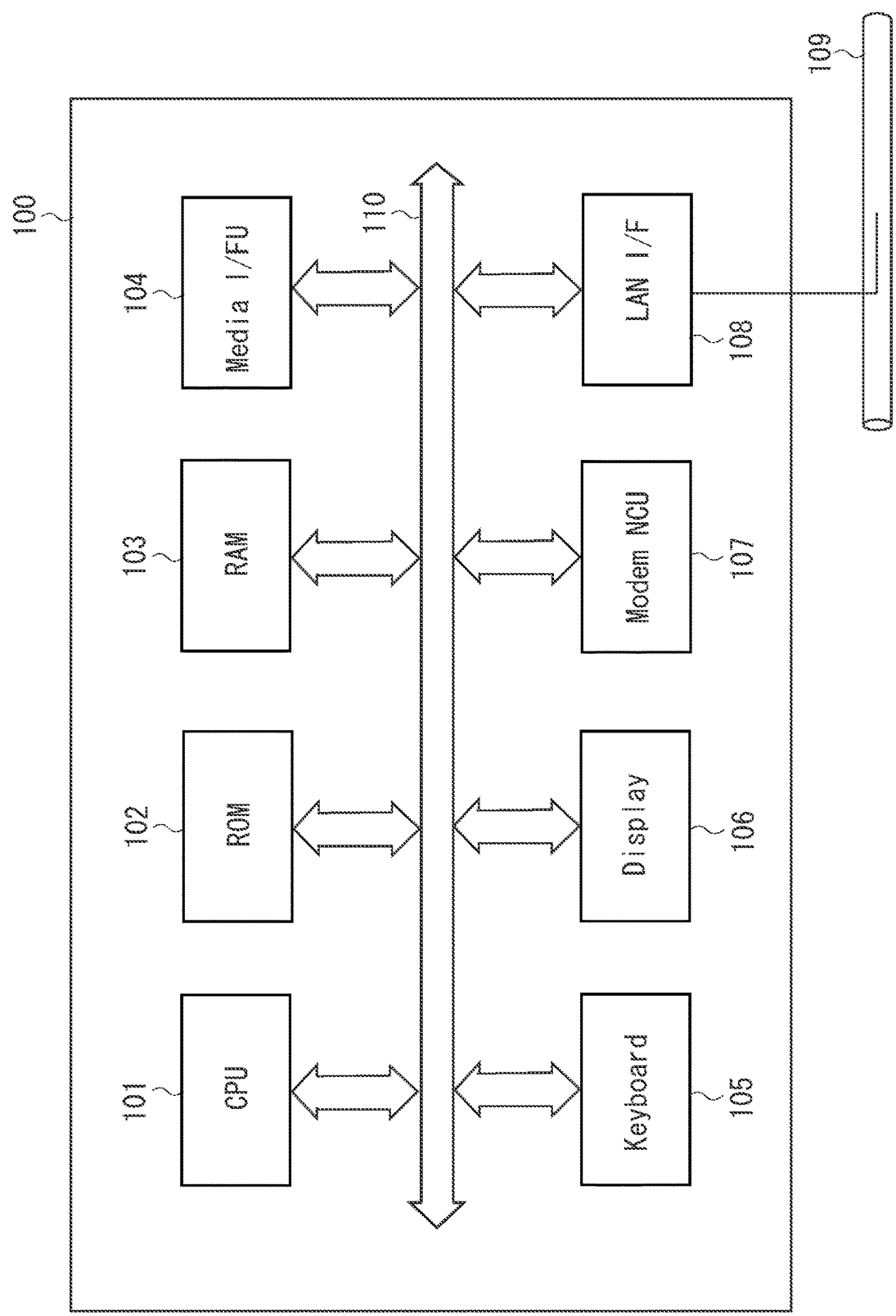
FIG. 1 is a diagram illustrating a configuration example of an image processing apparatus according to a first exemplary embodiment of the present invention.

FIG. 1 is a diagram illustrating a configuration of an image processing apparatus 100 according to a first exemplary embodiment of the present invention. Components will chiefly be described which are required in describing the first exemplary embodiment. Therefore, the image processing apparatus 100 according to the first exemplary embodiment may be configured including other components.

As illustrated in FIG. 1, the image processing apparatus 100 includes a central processing unit (CPU) 101, a read-only memory (ROM) 102, a random access memory (RAM) 103, a media interface (I/F) 104, a keyboard 105, a display 106, a modem/network control unit (NCU) 107, and a local area network (LAN) I/F 108. Those components can intercommunicate with one another via a bus 110. The CPU 101 reads apparatus operation commands from the ROM 102, and issues operation commands to the media I/F 104, the modem/NCU 107, and the LAN I/F 108. The ROM 102 previously stores various programs executable by the CPU 101. The RAM 103 is used as a work area to execute a program or to store data received from the media I/F 104 or to transmit data via the modem/NCU 107 or the LAN I/F 108. The media I/F 104 is an interface configured to be connectable to external media as the external storage devices to exchange data with the external media. The keyboard 105 is a device to select data displayed on the display 106 or input commands to the image processing apparatus 100. The display 106 displays information input from the keyboard 105 or displays data such as a file name acquired via the media I/F 104. The modem/NCU 107 is a unit containing a modem for facsimile transmission and an NCU. The LAN I/F 108 transmits data to an external apparatus via the LAN 109.

Figure 2:
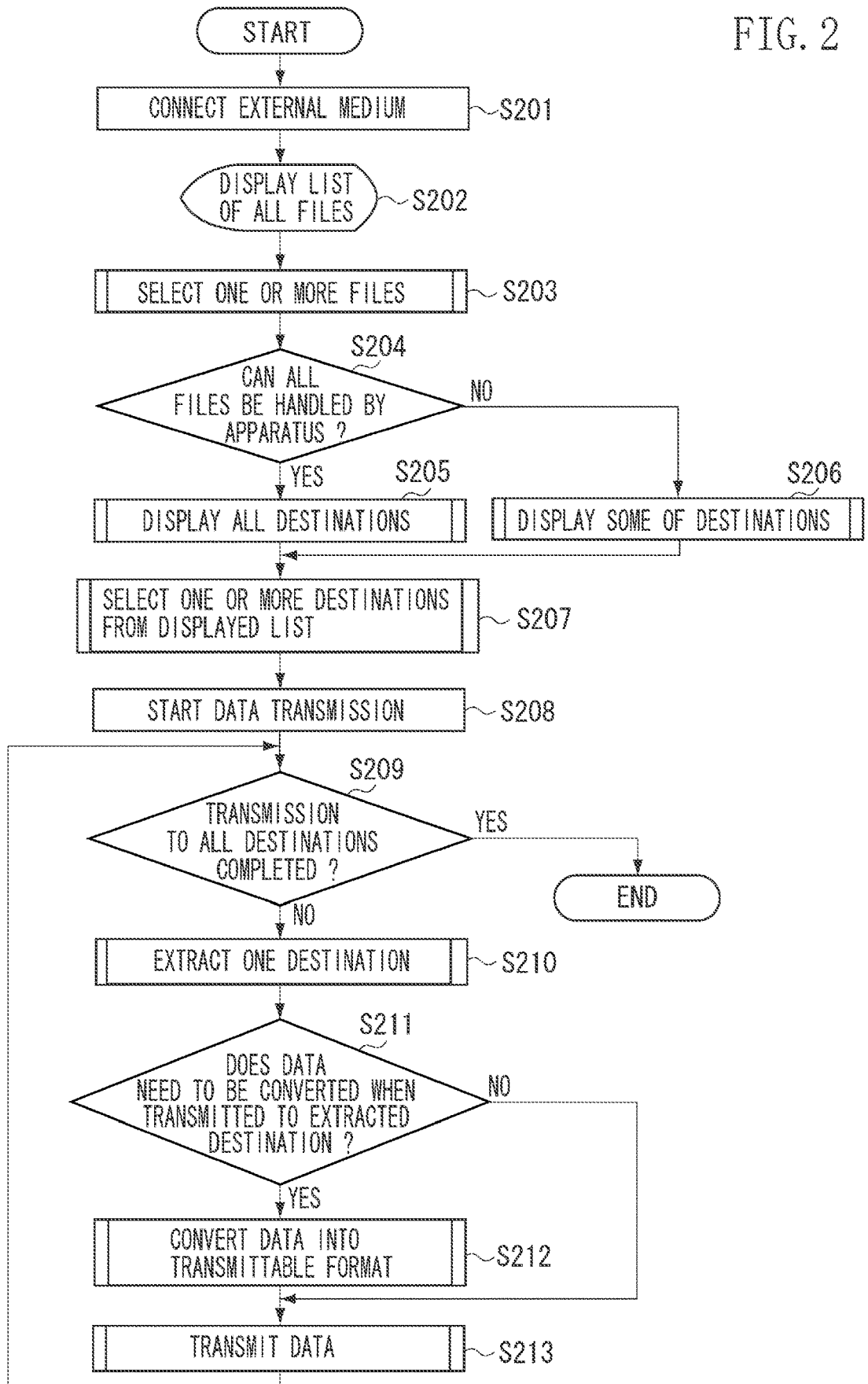
FIG. 2 is a flowchart illustrating a data transmission procedure according to the first exemplary embodiment of the present invention.

Referring to FIG. 2, a procedure by which the image processing apparatus 100 reads data from an external medium, and transmits the data to an external apparatus connected via the LAN 109 will be described. A processing to be described below can be implemented when the CPU 101 reads and executes a program stored in the ROM 102.

In step S201, the CPU 101 detects that an external medium is connected by a user to the media I/F 104. In step S202, the CPU 101 searches the inside of the external medium, generates a list of files (data), and then displays the list of files. Then, in step S203, the CPU 101 identifies information selected by a user's operation input via the keyboard 105. More specifically, the CPU 101 identifies a plurality of selected files from the list of files displayed in step S202.

In step S204, the CPU 101 distinguishes all of data formats of the files selected in step S203, and determines whether files have a data format that can be handled by the image processing apparatus 100. If all data can be handled in the image processing apparatus 100 (YES in step S204), the processing proceeds to step S205. If there is at least one data that cannot be handled by the image processing apparatus 100 (NO in step S204), the processing proceeds to step S206. In step S205, the CPU 101 displays all data in a table 401 (a first transmission method and a second transmission method) stored in the RAM 103 on the display 106, as illustrated in FIG. 4, and the processing proceeds to step S207. The table 401 displays transmission methods defined to correspond to respective destinations. On the other hand, in step S206, the CPU 101, referring to a table 402 as illustrated in FIG. 4, extracts only destinations (the second transmission method) that can be handled in the image processing apparatus 100, and displays related data on the display 106, and the processing proceeds to step S207. The table 402 defines whether data needs to be handled in the image processing apparatus 100 in respective transmission methods.

The first transmission method is a method in which all data can be transmitted regardless of data formats. The first transmission method includes "e-mail", "file transfer protocol (FTP)", "Server Message Block (SMB)". The second transmission method refers to a transmission method capable of transmitting only data of formats that can be handled by the image processing apparatus 100. The second transmission method includes "FAX", "Internet-FAX", and "transmission to the memory in the apparatus", for example.

In step S207, the CPU 101 selects a destination according to a user's operation input via the keyboard 105 out of destinations indicated on the display 106. In step S208, the CPU 101 starts transmission processing according to the selected destination. In step S209, the CPU 101 determines whether data transmission to all destinations selected in step S207 has been completed. If data has been transmitted to all destinations (YES in step S209), the processing ends. On the other hand, if there is any destination to which data has not been transmitted (NO in step S209), the processing proceeds to step S210.

In step S210, the CPU 101 extracts one destination, to which transmission has not been made, from among the destinations selected in step S207. In step S211, the CPU 101 determines whether data needs to be converted when data is transmitted to the destination extracted in step S210. If data needs to be converted (YES in step S211), the processing proceeds to step S212. If data does not need to be converted (NO in step S211), the processing proceeds to step S213. In step S212, the CPU 101 converts data to be transmitted into a transmittable data format, and stores the converted data in the RAM 103, and the processing proceeds to step S213. In step S213, the CPU 101, which now functions as a transmission unit, transmits data converted in step S212 and stored in the RAM 103, or a file (data) selected in step S203 and not converted in step S212, to the destination (external apparatus), and the processing returns to step S209.

As described above, a data transmission method in the flowchart in FIG. 2 is as follows. A user is made to select a file to transmit from among the files stored in an external storage device. When a file is selected, the user selects a transmission method that can transmit the selected file. The image processing apparatus 100 determines whether the file is of a data format that cannot be handled by the image processing apparatus 100. Then, if the file is of a data format that cannot be handled by the image processing apparatus 110, the image processing apparatus 100 displays only the first transmission method on the display 106. If the file is not of the data format that cannot be handled by the apparatus, the image processing apparatus 100 displays the first and second transmission methods on the display 106. In this manner, since available transmission methods are restricted according to a data format of a selected file, and a user is made to select a transmission method, the image processing apparatus 100 can transmit even data that cannot be handled by the apparatus. In other words, the image processing apparatus 100 expands types of data that can be transmitted and reduces the complexity of the user's operation.

Figure 3:
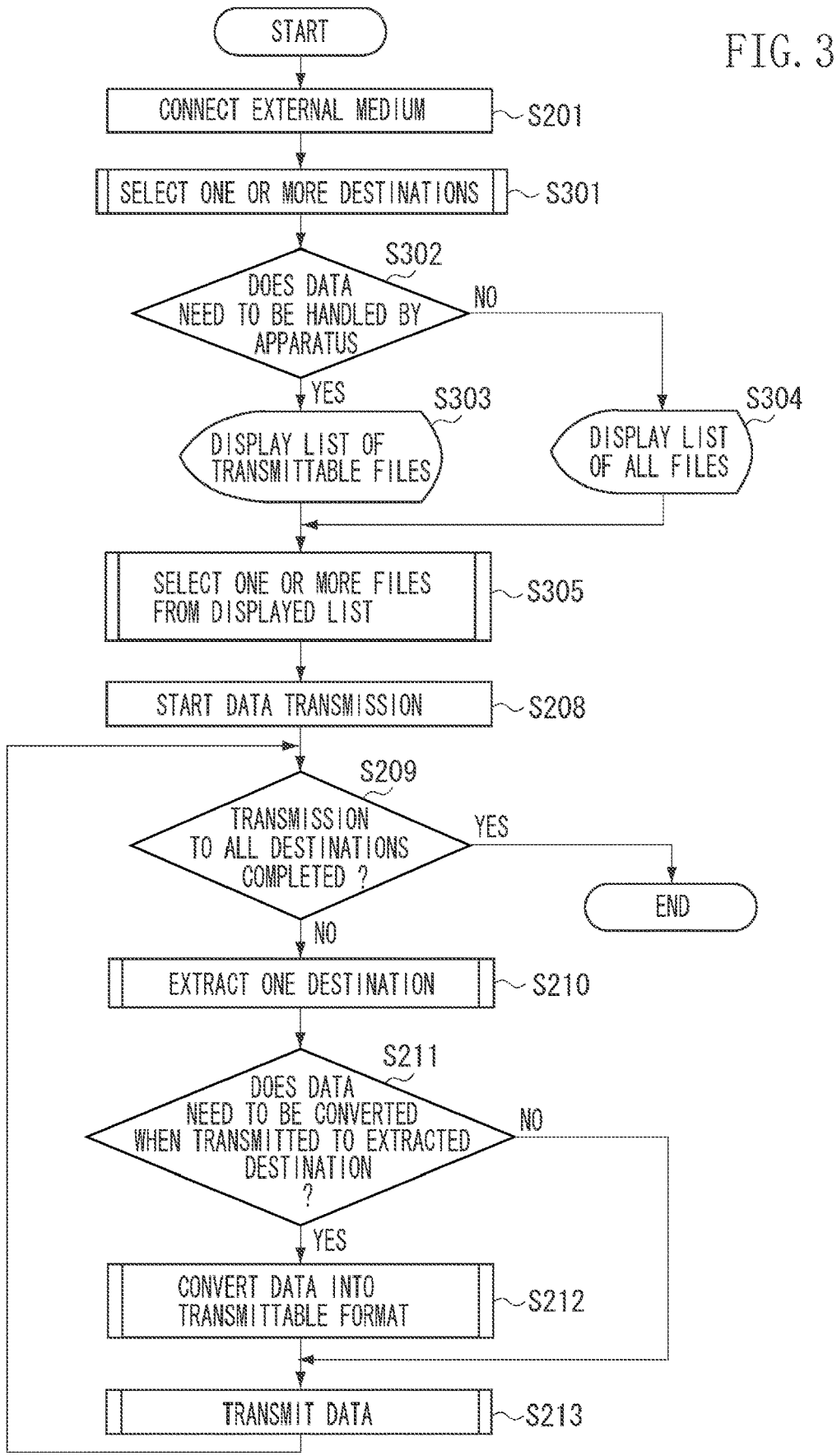
FIG. 3 is a flowchart illustrating a modified example of the procedure illustrated in FIG. 2.

Referring to FIG. 3, a first modification of the flowchart in FIG. 2 will be described. In the flowchart in FIG. 2, the user is previously made to select a file to transmit, and selectable transmission methods are restricted according to the selected file. On the other hand, in the flowchart in FIG. 3, first of all, the user is made to select a transmission method (destination), and selectable files are restricted according to the selected transmission method. The operations similar to those in the flowchart in FIG. 2 are designated by the same step numbers used in FIG. 2 and their descriptions are not repeated here. The operations in steps S301 to S305 will be described in the following.

In step S301, the CPU 101 displays the entirety of the table 401 stored in the RAM 103 on the display 106, and selects one or more destinations (transmission methods) according to the user's operation via the keyboard 105. In step S302, referring to the table 402, the CPU 101 determines whether the destination selected in step S301 includes a transmission method in which data needs to be handled by the image processing apparatus 100. If the selected destination includes a transmission method in which data needs to be handled by the image processing apparatus 100 (YES in step S302), the processing proceeds to step S303. If all destinations use transmission methods in which data does not need to be handled by the image processing apparatus 100 (NO in step S302), the processing proceeds to step S304.

In step S303, the CPU 101 receives only files, which can be handled by the image processing apparatus 100, from an external medium connected to the media I/F 104, and displays file names on the display 106. On the other hand, in step S304, the CPU 101 receives all files from an external medium connected to the media I/F 104, and displays them on the display 106, and the processing proceeds to step S305. In step S305, the CPU 101 selects one or more files according to a user operation input on the keyboard 105 from a file list displayed in step S303 or S304. Then, as described above, with operations in steps S208 to S213, the CPU 101 transmits all selected files, and the processing then ends.

As described above, in a data transmission method according to the flowchart in FIG. 3, a user is made to select a transmission method when a file stored in an external storage device is transmitted from among transmission methods in which data can be handled by the image processing apparatus 100. When a transmission method is selected, the user is made to select a file that can be transmitted by the selected transmission method.

The image processing apparatus 100 determines whether a transmission method in which data needs to be handled by the image processing apparatus 100 is included in the selected transmission methods. When a transmission method which requires data to be handled by the image processing apparatus 100 is included, the image processing apparatus 100 displays only files that can be handled by the image processing apparatus 100 on the display 106, or if a transmission method requiring data to be handled by the image processing apparatus 100 is not included, displays all files on the display 106. Because the image processing apparatus 100 restricts transmittable files according to a transmission method selected by the user and then allows the user to select a transmittable file, the image processing apparatus 100 enables data that cannot be handled by the apparatus to be transmitted. In other words, the image processing apparatus 100 according to the present exemplary embodiment can expand a range of transmittable data and reduce operational complexity for the user.

Figure 5A:
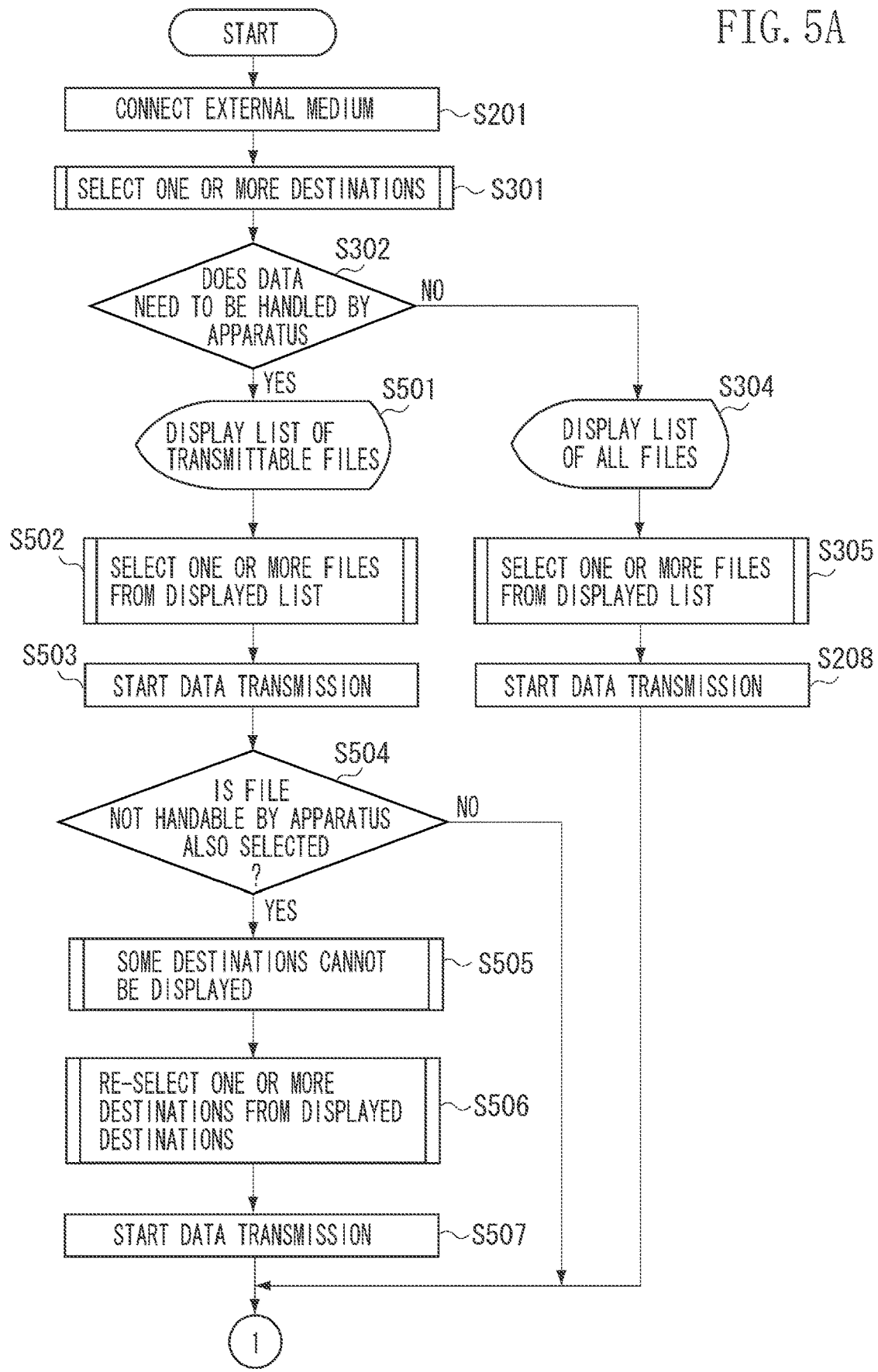
FIG. 5, composed of FIGS. 5A and 5B, is a flowchart illustrating a modified example of the procedure illustrated in FIG. 3.
Figure 5B:
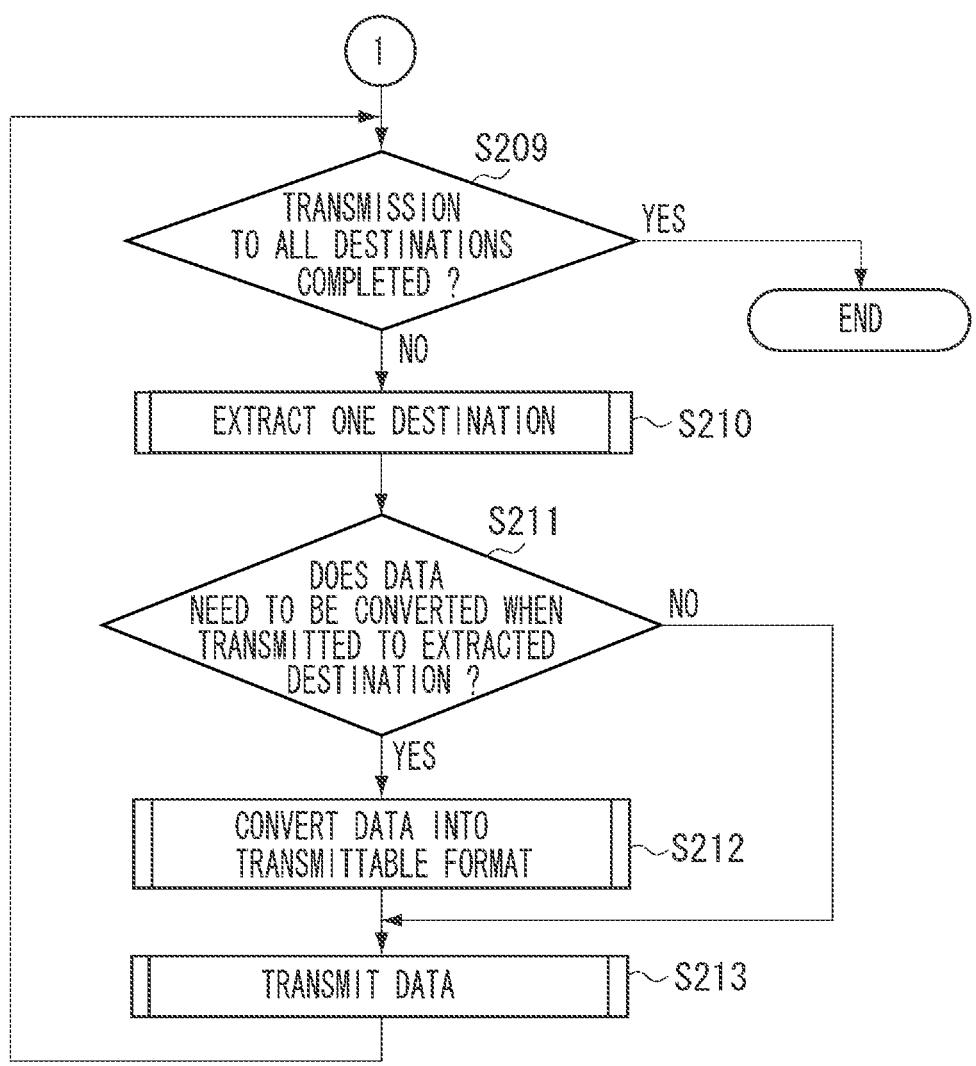

Referring to FIG. 5, composed of FIGS. 5A and 5B, a second modification of the flowchart in FIG. 3 will be described. The operations similar to those in the flowchart in FIG. 2 are designated by the same step numbers used in FIG. 2 and their descriptions are not repeated here. The operations in steps S501 to S507 will be described. In the flowchart in FIG. 3, the file name list displayed on the display 106 is restricted to files that can be handled by the image processing apparatus 100. However, those file names that fall under this restriction are also displayed and when a file of them is selected, it will be subject to control, which will be described below.

In step S501, the CPU 101 distinguishes and obtains files that can be handled and files that cannot be handled by the image processing apparatus 100 from the files stored in an external medium connected to the media I/F 104, and displays those file names divided into separate groups on the display 106. In step S502, according to a user's operation input via the keyboard 105, the CPU 101 selects a plurality of files from a file name list, which has been divided in step S501. In step S503, the CPU 101 starts data transmission according to the selected destinations.

In step S504, the CPU 101 distinguishes all data formats of files selected in step S502, and determines whether the data formats of the files can be handled by the image processing apparatus 100. If there is even one file, which cannot be handed by the image processing apparatus 100, in all of the selected files, the processing proceeds to step S505, or if all of the selected files are files that can be handled by the image processing apparatus 100, the processing proceeds to S209.

In step S505, the CPU 101 obtains and displays on the display 106 only destinations which have "NO" as information about whether data needs to be handled by the apparatus in the table 402 stored in the ROM 102. In step S506, the CPU 101 re-selects one or more files according a user's operation input via the keyboard 105 from among the files displayed on the display 106. In step S507, the CPU 101 starts data transmission processing according to the re-selected destinations.

As described above, the method of data transmission in the flowchart in FIG. 5 is summarized as follows. To begin with, a user is made to select a transmission method when a file stored in an external storage device is transmitted, from among the transmission methods that can be handled by the image processing apparatus 100. When a transmission method is selected, the user selects a file that can be transmitted by the selected transmission method.

Then, the image processing apparatus 100 determines whether a transmission method requiring data to be handled by the image processing apparatus 100 is included in the selected transmission methods. If there is included a transmission method requiring data to be handled by the image processing apparatus 100, unlike in the first modification of the flowchart in FIG. 3, the image processing apparatus 100 displays on the display 106 in separate groups files that can be handled by the image processing apparatus 100 and other files that cannot be handled by the image processing apparatus 100. In this case, if a file that cannot be handled by the image processing apparatus 100 is selected, like in the flowchart in FIG. 2, the image processing apparatus 100 allows the user to select a transmission method that can transmit this file. With this arrangement, the image processing apparatus 100 restricts transmittable files according to the selected transmission method, and allows the user to select a file, with the result that data which cannot be handled by the apparatus can be transmitted. In other words, the image processing apparatus 100 can expand a range of transmittable data and reduce the complexity of user's operation.

A second exemplary embodiment of the present invention will be described with reference to FIGS. 6 to 11. In the first exemplary embodiment described above, for example, when a user selects e-mail or file transfer protocol (FTP) as a transmission method, files of a data format that cannot be handled by the image processing apparatus 100 can be transmitted to an external apparatus. However, if it is permitted that all files can be transmitted, in the event that data is infected with virus, the user may end up losing important data, or your business may suffer massive economic damage and lose confidence in society. Therefore, in the second exemplary embodiment, a more secure and flexible transmission method for external media data is realized even if the user selects a transmission method, such as e-mail, FTP, by which data of all data formats can be transmitted to external apparatuses. More specifically, in the second exemplary embodiment, in addition to the configuration in the first exemplary embodiment, an additional configuration that can set a restriction on each transmission method by a user's operation is provided.

Figure 6:
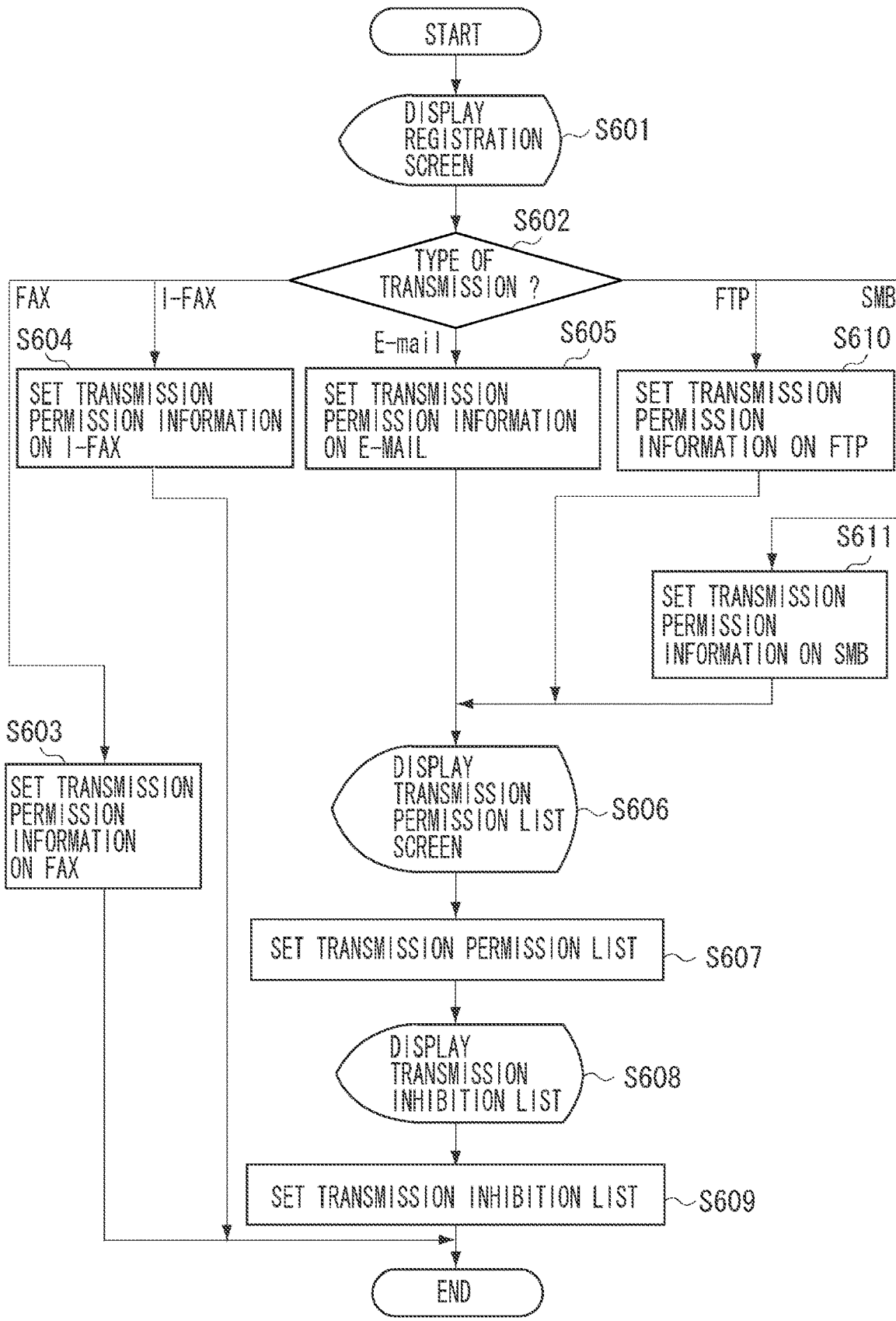
FIG. 6 is a flowchart illustrating a procedure of setting a restriction on selection of files by transmission methods according to a second exemplary embodiment of the present invention.

Referring to FIGS. 6 and 7, a procedure of setting a restriction on files in each transmission method will be described. The following operations are performed when the CPU 101 reads and executes a program stored in the ROM 102.

In step S601, the CPU 101 displays information used to register items in a table 700 on the display 106. As illustrated in FIG. 7, the table 700 is a table obtained by combining the items in the table 402 in FIG. 4 with items in a section 701, which sets a restriction on transmission of data from an external medium in each transmission method. For example, the display 106 indicates types of transmission (transmission methods), such as FAX, Internet-FAX, E-Mail, FTP, and SMB in a selectable manner. In step S602, the CPU 101 determines which transmission type is selected by a user's operation via the keyboard 105. If FAX is selected, the processing proceeds to step S603. If Internet-FAX, E-Mail, FTP, or SMB is selected, the processing advances to step S604, S605, S610, or S611, respectively. Before the processing advances to step S603, S604, S605, S610, or S611, the CPU 101 indicates restrictions that can be set in the items in the section 701 in a selectable manner for each selected type of transmission on the display 106. For example, if FAX is set as the type of transmission, the CPU 101, referring to the items in the section 701 in the table 700, obtains "Inhibited" and "Permitted Only About Data Convertible by Apparatus", and displays them in a selectable manner on the display 106.

As illustrated in FIG. 7, restrictions that can be set in the items in the section 701 are "Inhibited", "Permitted Only About Data Convertible by Apparatus", "All Permitted", and "Determined According to List". The restriction in "Inhibited" means to inhibit transmission of all files included in an external medium. The restriction in "Permitted Only About Data Convertible by Apparatus" means to permit transmission of only files of a data format that enables data conversion by the image processing apparatus 100, namely, only files of a data format that can be handled by the image processing apparatus from among the files included in an external medium. The restriction in "All Permitted" means to permit transmission of all files included in an external medium. The restriction in "Determined According to List" means to set a restriction to transmission methods according to a transmission permission list or a transmission inhibition list.

In step S603, according to the content of the table 700 stored in the RAM 103, the CPU 101 updates the item in the section 701 corresponding to the transmission type "FAX", and the processing then ends. In other words, referring to the restrictions displayed on the display 106, the CPU 101 updates the item in the section 701 with a selected restriction input via the keyboard 105. If "Inhibited" is selected, for example, data representing "Inhibited" is written. If "Permitted Only About Data Convertible by Apparatus" is selected, data representing "Permitted Only About Data Convertible by Apparatus" is selected, data representing "Permitted Only About Data Convertible by Apparatus" is written.

In step S604, like in step S603, according to the content of the table 700 stored in the RAM 103, the CPU 101 updates the item in the section 701 corresponding to the transmission type "Internet-FAX", and the processing then ends. In step S605, S6190, or S611, like in step S603, according to the content of the table 700 stored in the RAM 103, the CPU 101 updates the item in the section 701 corresponding to the transmission type "E-Mail", "FTP", or "SMB", respectively, and the processing proceeds to step S606.

Figure 8:
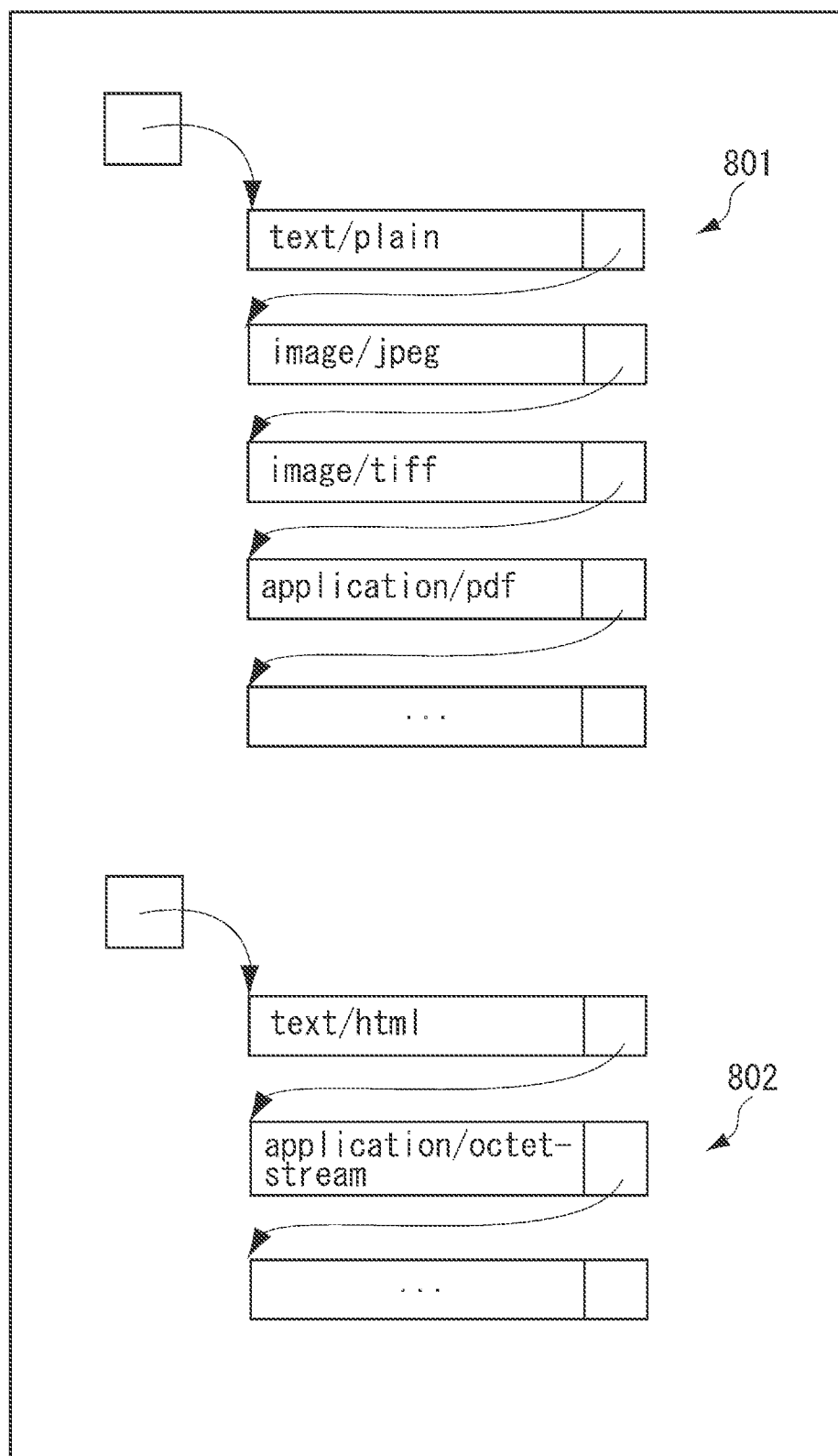
FIG. 8 illustrates examples of a list of transmission permission settings and a list of transmission inhibition settings according to the second exemplary embodiment of the present invention.

In step S606, the CPU 101 displays information to update a transmission permission list 801 on the display 106. As illustrated in FIG. 8, the transmission permission list 801 defines a data format that can be transmitted when "Determined According to List" is selected. The CPU 101 displays, for example, predetermined data formats in a selectable manner on the display 106. In the next step S607, the CPU 101 sets data formats in the transmission permission list 801 according to a user's operation. For example, if a user's operation requests that transmission of text data in an external medium should be permitted, the CPU 101 sets data representing "plain text" in the transmission permission list 108. On the other hand, if the user's operation requests that a permission to transmit text data in the external medium should be withdrawn, data representing "plain text" is deleted from the transmission permission list 801.

In step S608, the CPU 101 displays information which is used to update a transmission inhibition list 802 on the display 106. As illustrated in FIG. 8, if "Determined According to List" is selected as a restriction, data to inhibit transmission is defined in the transmission inhibition list 802. Then, the CPU 101 displays, for example, predetermined data formats in a selectable manner on the display 106. In step S609, the CPU 101 sets a data format in the transmission inhibition list 802 according to the user's operation. For example, if the user's operation requests that transmission of HTML data in an external medium should be inhibited, the CPU 101 adds data representing "html text". On the other hand, if the user's operation requests that the inhibition of transmission of HTML data in an external medium should be withdrawn, the CPU 101 deletes date representing "html text" from the transmission inhibition list 802.

As described above, in the second exemplary embodiment, the user can set whether to permit data transmission or not. Therefore, according to the second exemplary embodiment, for example, by referring to the above-mentioned restriction during data transmission processing described with reference to the flowchart in FIG. 2, data transmission is restricted. Referring to FIG. 9, the processing will be described in greater detail as follows. The processing of the flowchart in FIG. 9 will be completed before step S213 of the flowchart in FIG. 2 is executed. The processing is implemented when the CPU 101 reads and executes a program stored in the ROM 102.

In step S901, when the information in the item of the section 701 corresponding to a file to be transmitted is "Determined According to List", the CPU 101 determines whether the type of a file to be transmitted is registered in the transmission permission list 801 or the transmission inhibition list 802. It the file type is not registered, the processing proceeds to step S902, or if the file type is registered, the processing ends. In step 902, the CPU 101 displays the transmission permission list 801 and the transmission inhibition list 802 for the user to register an unregistered file type in either of the two lists. In other words, the CPU 101 asks the user whether the user wishes to permit (YES in step S902) or inhibit (NO in step S902) transmission according to the data format of data. In step S902, if the CPU 101 determines to add the file type to the transmission permission list 801 according to a selection result by the user's operation from the displayed content on the display 106, the processing proceeds to step S903, in which the CPU 101 adds the file type (data format) to the transmission permission list 801. On the other hand, if the CPU 101 determines to add the file type to the transmission inhibition list 802, the processing proceeds to step S904, in which the CPU 101 adds the file type to the transmission inhibition list 802. The processing then ends. Then, in step 213, the CPU 101 determines whether to transmit the data according to the restriction set by the user or not.

As described above, the image processing apparatus according to the second exemplary embodiment is configured by adding a function of registering a restriction for each data format in each transmission method by the user's operation, to the configuration of the first exemplary embodiment. Therefore, the image processing apparatus can realizes data transmission in a more flexible manner. The present invention is not limited to the exemplary embodiments described above, but various changes and modifications may be made in the invention. For example, the table 700 may be provided for each user or each group (each corporate department). In this case, the transmission permission list 801 and the transmission inhibition list 802 are set for each table.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A communication apparatus capable of communicating in a plurality of protocols, the communication apparatus comprising:
   a user interface that selects a file from among a plurality of files stored in a storage, the user interface being able to set a destination;
   a transmission interface that transmits, to the destination, the file selected by the user interface in accordance with a protocol corresponding to the destination set by the user interface; and
   a controller that permits the user interface to select at least one of the plurality of files which are not able to be converted by the communication apparatus if the destination set by the user interface is a destination of a first protocol of the plurality of the protocols,
   wherein the controller does not permit the user interface to select the at least one of the plurality of files which are not able to be converted by the communication apparatus if the destination set by the user interface is a destination of a. second protocol of the plurality of the protocols.

2. The communication apparatus according to claim 1, further comprising a display that displays the at least one of the plurality of files selectable by the user interface, wherein the controller restricts the display from displaying the at least one of the plurality of files which are not able to be converted by the communication apparatus.

3. The communication apparatus according to claim 1, further comprising:
   a device interface being able to connect an external storage device,
   wherein the user interface selects a file from files stored in the external storage device.

4. The communication apparatus according to claim 1, wherein the plurality of protocols includes an e-mail protocol and a facsimile protocol, and
   wherein the second protocol is the facsimile protocol.

5. A communication apparatus capable of communicating in a plurality of protocols, the communication apparatus comprising:
   a user interface that selects a file from among a plurality of files stored in a storage, the user interface being able to select a protocol from the plurality of protocols;
   transmission interface that transmits the file selected by the user interface in accordance with the protocol selected by the user interface; and
   a controller that permits the user interface to select at least one of the plurality of files which are not able to be converted by the communication apparatus if the protocol selected by the user interface is a first protocol of the plurality of the protocols,
   wherein the controller does not permit the user interface to select the at least one of the plurality of files which are not able to be converted by the communication apparatus if the protocol selected by the user interface is a second protocol of the plurality of the protocols.

6. The communication apparatus according to claim 5, further comprising a display that displays the at least one of the plurality of files selectable by the user interface,
   wherein the controller restricts the display from displaying the at least one of the plurality of files which are not able to be converted by the communication apparatus.

7. The communication apparatus according to claim 5, further comprising:
   a device interface being able to connect an external storage device,
   wherein the user interface selects a file from files stored in the external storage device.

8. The communication apparatus according to claim 5, wherein the plurality of protocols includes an e-mail protocol and a facsimile protocol, and
   wherein the second protocol is the facsimile protocol.

9. A control method for controlling a communication apparatus capable of communicating in a plurality of protocols, the control method comprising:
   selecting a file from among a plurality of files stored in a storage;
   setting a destination;
   transmitting, to the destination, the selected file in accordance with a protocol corresponding to the set destination.;
   determining whether the destination is a destination of a predetermined protocol;
   permitting selection of at least one of the plurality of files which are not able to be converted by the communication apparatus if the destination set by the user interface is a destination of a first protocol of the plurality of the protocols; and
   not permitting selection of the at least one of the plurality of files of which are not able to be converted by the communication apparatus if the set destination is a destination of a second protocol of the Plurality of the protocols.

10. A non-transitory computer readable storage medium for storing a computer program for controlling a communication apparatus capable of communicating in a plurality of protocols, the computer program comprising:

a code to select a file from among a. plurality of files stored in a storage;

a code to set a destination;

a code to transmit, to the destination, the selected file in accordance with a protocol corresponding to the set destination;

a code to determine whether the destination is a destination of a predetermined protocol;

a code to permit selection of at least one of the plurality of files which are not able to be converted. by the communication apparatus if the destination set by the user interface is a destination of a first protocol of the plurality of the protocols; and a code to not permit selection of the at least one of the plurality of files which are not able to be converted by the communication apparatus if the set destination is a destination of a second protocol of the plurality of the protocols.

\* \* \* \* \*